(12) United States Patent
Smith, Jr.

(10) Patent No.: US 10,837,847 B2
(45) Date of Patent: Nov. 17, 2020

(54) ANGULAR ROTATION SENSOR

(71) Applicant: Microsemi Corporation, Aliso Viejo, CA (US)

(72) Inventor: Kevin Mark Smith, Jr., Dana Point, CA (US)

(73) Assignee: Microsemi Corporation, Chandler, AZ (US)

(*) Notice: Subject to any disclaimer, the term of this patent is extended or adjusted under 35 U.S.C. 154(b) by 73 days.

(21) Appl. No.: 16/152,802

(22) Filed: Oct. 5, 2018

(65) Prior Publication Data

US 2020/0109996 A1  Apr. 9, 2020

(51) Int. Cl.
*G01L 3/10* (2006.01)
*G01B 7/30* (2006.01)

(52) U.S. Cl.
CPC ............ *G01L 3/105* (2013.01); *G01B 7/30* (2013.01)

(58) Field of Classification Search
CPC ....... G01L 3/105; G01B 7/30; G01R 33/3415; B62D 6/10
USPC .................................................... 73/862.191
See application file for complete search history.

(56) References Cited

U.S. PATENT DOCUMENTS

| | | | |
|---|---|---|---|
| 4,847,548 A | 7/1989 | Lafler | |
| 4,853,604 A | 8/1989 | McMullin et al. | |
| 5,061,896 A | 10/1991 | Schmidt | |
| 5,239,288 A | 8/1993 | Tsals | |
| 6,236,199 B1 | 5/2001 | Irle et al. | |
| 6,239,571 B1 | 5/2001 | Shimahara | |
| 6,255,810 B1 | 7/2001 | Irle et al. | |
| 6,304,014 B1 | 10/2001 | England et al. | |
| 6,304,076 B1 | 10/2001 | Madni et al. | |
| 6,384,598 B1* | 5/2002 | Hobein | G01D 5/2046 318/654 |

(Continued)

FOREIGN PATENT DOCUMENTS

| | | |
|---|---|---|
| DE | 10120822 A1 | 4/2002 |
| EP | 0467514 A2 | 1/1992 |

(Continued)

OTHER PUBLICATIONS

PCT/US2019/042895, International Search Report, dated Oct. 21, 2019.

(Continued)

*Primary Examiner* — Octavia Hollington
(74) *Attorney, Agent, or Firm* — Glass and Associates; Kenneth Glass (57) ABSTRACT

An angular rotation sensor system constituted of: a first target with a member radially extending from, and rotating about a longitudinal axis of the first target; a second target with a member radially extending from, and rotating about a longitudinal axis of the second target; a first receive coil comprising a plurality of loops laid out such that adjacent loops exhibit opposing magnetic polarities responsive to a radio frequency current injected into the transmit coil; a second receive coil comprising a plurality of loops laid out such that adjacent loops exhibit opposing magnetic polarities responsive to a radio frequency current injected into the transmit coil; and an output coupled to each of the first and second receive coils, wherein each of the members is shaped and sized to generally match a shape and size of a pair of loops.

17 Claims, 9 Drawing Sheets

(56) References Cited

U.S. PATENT DOCUMENTS

| | | |
|---|---|---|
| 6,522,128 B1 | 2/2003 | Ely et al. |
| 6,593,730 B2 | 7/2003 | Zapf |
| 6,605,940 B1 | 8/2003 | Tabrizi et al. |
| 7,276,897 B2 | 10/2007 | Lee |
| 7,726,208 B2 | 6/2010 | Hoeller et al. |
| 7,821,256 B2 | 10/2010 | Lee |
| 7,906,960 B2 * | 3/2011 | Lee ................ G01D 5/2013 324/207.25 |
| 8,508,242 B2 | 8/2013 | Shao et al. |
| 8,947,077 B2 | 2/2015 | Lee et al. |
| 8,988,066 B2 * | 3/2015 | Shao ................ G01B 7/30 324/207.16 |
| 9,677,913 B2 | 6/2017 | Wang et al. |
| 10,415,952 B2 | 9/2019 | Reddy |
| 2002/0000129 A1 | 1/2002 | Madni et al. |
| 2002/0097042 A1 * | 7/2002 | Kawate ................ G01B 7/003 324/207.17 |
| 2003/0206007 A1 | 11/2003 | Gass et al. |
| 2004/0080313 A1 | 4/2004 | Brosh |
| 2008/0164869 A1 | 7/2008 | Bach et al. |
| 2009/0079422 A1 | 3/2009 | Lee |
| 2017/0158231 A1 * | 6/2017 | Farrelly ................ B62D 6/10 |
| 2017/0166251 A1 * | 6/2017 | Shao ................ G01L 3/105 |
| 2019/0242725 A1 | 8/2019 | Shaga et al. |
| 2019/0331541 A1 * | 10/2019 | Janisch ................ B62D 1/046 |

FOREIGN PATENT DOCUMENTS

| | | |
|---|---|---|
| EP | 1914520 A2 | 4/2008 |
| EP | 2145158 A2 | 1/2010 |
| FR | 2304900 A1 | 10/1976 |
| JP | 3839449 B2 | 8/2006 |
| WO | 2008125853 A1 | 10/2008 |
| WO | 2017100515 A1 | 6/2017 |
| WO | 2018108783 A2 | 6/2018 |

OTHER PUBLICATIONS

PCT/US2019/042895, Written Opinion of the International Search Authority, dated Oct. 21, 2019.

"A Revolution in Sensing: World's First Inductance-to-Digital Converter", Texas Instruments, 2013, pp. 1-6.

* cited by examiner

| | |
|---|---|
| 1000 | PROVIDE FIRST TARGET WITH TARGET MEMBER ARRANGED TO ROTATE ABOUT LONGITUDINAL AXIS |
| 1010 | PROVIDE SECOND TARGET WITH TARGET MEMBER ARRANGED TO ROTATE ABOUT LONGITUDINAL AXIS |
| 1020 | PROVIDE FIRST RECEIVE COIL WITH PLURALITY OF LOOPS LAID OUT SUCH THAT ADJACENT LOOPS EXHIBIT OPPOSING MAGNETIC POLARITIES RESPONSIVE TO RF FREQUENCY CURRENT FLOWING THERETHROUGH, TARGET MEMBER SIZED AND SHAPED TO GENERALLY MATCH SIZE AND SHAPE OF TARGET MEMBER |
| 1030 | PROVIDE SECOND RECEIVE COIL WITH PLURALITY OF LOOPS LAID OUT SUCH THAT ADJACENT LOOPS EXHIBIT OPPOSING MAGNETIC POLARITIES RESPONSIVE TO RF FREQUENCY CURRENT FLOWING THERETHROUGH, OPT. FIRST AND SECOND COILS BETWEEN FIRST AND SECOND TARGETS, OPT. FIRST TARGET BETWEEN SECOND TARGET AND COILS |
| 1040 | GENERATE MAGNETIC FIELD IN EACH LOOP |
| 1050 | RECEIVE OUTPUT OF EACH RECEIVE COIL |
| 1060 | (OPT.) RESPONSIVE TO OUTPUT, DETERMINE DIFFERENCE BETWEEN ROTATION ANGLE OF FIRST TARGET ABOUT LONGITUDINAL AXIS AND ROTATION ANGLE OF SECOND TARGET ABOUT LONGITUDINAL AXIS |
| 1070 | (OPT.) RESPONSIVE TO DETERMINED ROTATION ANGLE DIFFERENCE, DETERMINE AMOUNT OF TORQUE APPLIED TO STEERING SHAFT COUPLED TO SECOND TARGET, A MOTOR SHAFT COUPLED TO FIRST TARGET |
| 1080 | (OPT.) RESPONSIVE TO PROVIDED OUTPUT, DETERMINE ANGULAR POSITION OF ONE OF FIRST AND SECOND TARGETS IN RELATION TO PREDETERMINED POINT |

FIG. 5

ANGULAR ROTATION SENSOR

BACKGROUND OF THE INVENTION

The invention relates generally to the field of inductive sensors and in particular to a system and method for sensing angular rotation between two targets.

Electrically powered steering wheel systems have been developed to meet to meet tighter fuel economy standards. This is achieved by replacing belt-driven hydraulic pumps, which constantly run whether assistance is required or not, with a brushless direct-current (DC) motor (BLDC). The electric motor is activated only when steering assist is required, thereby saving energy. Another major advantage is the elimination of a belt-driven engine accessory, and several high-pressure hydraulic hoses between the hydraulic pump, mounted on the engine, and the steering gear, mounted on the chassis. This greatly simplifies manufacturing and maintenance. By incorporating electronic stability control, electric power steering systems can instantly vary torque assist levels to aid the driver in corrective maneuvers. As a result, there is a rapid increase in the demand for steering wheel sensing systems which are low cost and reliable.

Figure 1:
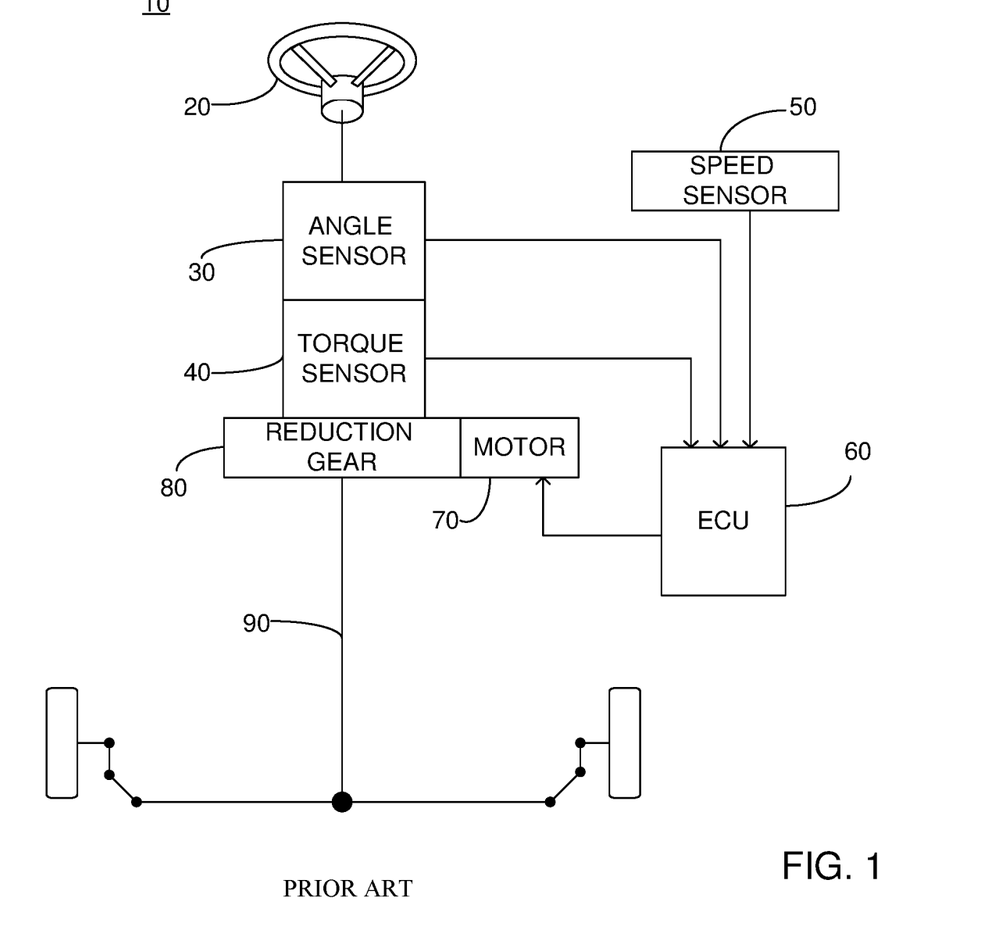
FIG. 1 illustrates a high level block diagram of an electrical power steering wheel system, as known to the prior art.

FIG. 1 illustrates a high level block diagram of an electrical powered steering wheel system 10 known to the prior art, electrical powered steering wheel system 10 comprising: a steering wheel 20; a steering angular position sensor 30; a torque sensor 40; a vehicle speed sensor 50; an electronics control unit (ECU) 60; a motor 70, in one embodiment comprising a BLDC motor; a reduction gear 80; and a steering column 90. Steering angular position sensor 30 is arranged to track the rotation of steering wheel 20 and ECU 60 is arranged to determine the angular position of steering wheel 20 responsive to the tracking of steering angular position sensor 30. ECU 60 is further arranged, in cooperation with torque sensor 40, to determine the torque applied to steering wheel 20. Responsive to the determined angular position and applied torque, ECU 60 is arranged to apply assistive torque via motor 70 to reduction gear 80 for delivery to steering column 90. The applied assistive torque is further responsive to the speed of the vehicle detected by vehicle speed sensor 50.

As illustrated, system 10 relies primarily on steering angular position sensor 30 and torque sensor 40. U.S. Pat. No. 7,726,208, granted Jun. 1, 2010 to Hoeller et al., the entire contents of which incorporated herein by reference, is addressed to a combined steering and torque sensor. Unfortunately, the design of Hoeller requires several sensor circuitries, which thus requires separate integrated circuits for the steering angle sensor element and the steering torque sensor element, which is undesirable.

SUMMARY OF THE INVENTION

Accordingly, it is a principal object of the present invention to overcome disadvantages of prior art methods and arrangements of angular rotation measurement. This is provided in the present disclosure by an angular rotation sensor system comprising: a first target, the first target comprising at least one target member radially extending from a longitudinal axis of the first target, the first target arranged to rotate about the longitudinal axis of the first target; a second target, the second target comprising at least one target member radially extending from the longitudinal axis of the second target, the second target arranged to rotate about the longitudinal axis of the first target; a transmit coil; and a first receive coil comprising a plurality of loops, the loops of the first receive coil laid out such that adjacent loops exhibit opposing magnetic polarities responsive to a radio frequency current injected into the transmit coil; a second receive coil comprising a plurality of loops, the loops laid of the first receive coil laid out such that adjacent loops exhibit opposing magnetic polarities responsive to a radio frequency current injected into the transmit coil, wherein each of the target members of the first target and the second target is shaped and size to generally match a shape and size of a pair of adjacent ones of the plurality of loops.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF THE PREFERRED EMBODIMENTS

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 2A:
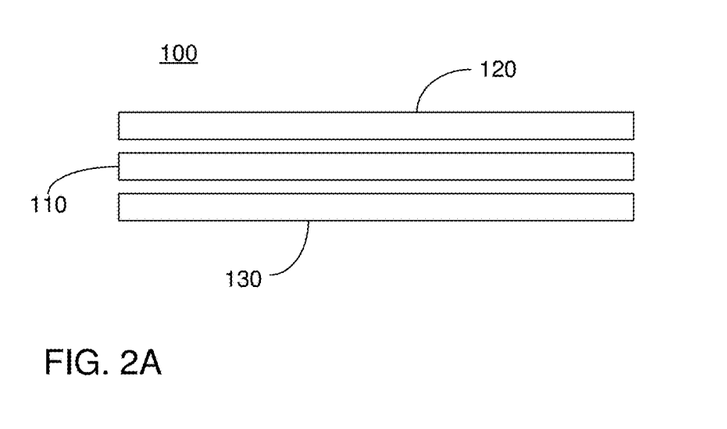
FIGS. 2A-2J illustrate various views of a first embodiment of an angular rotation sensing system.
Figure 2B:
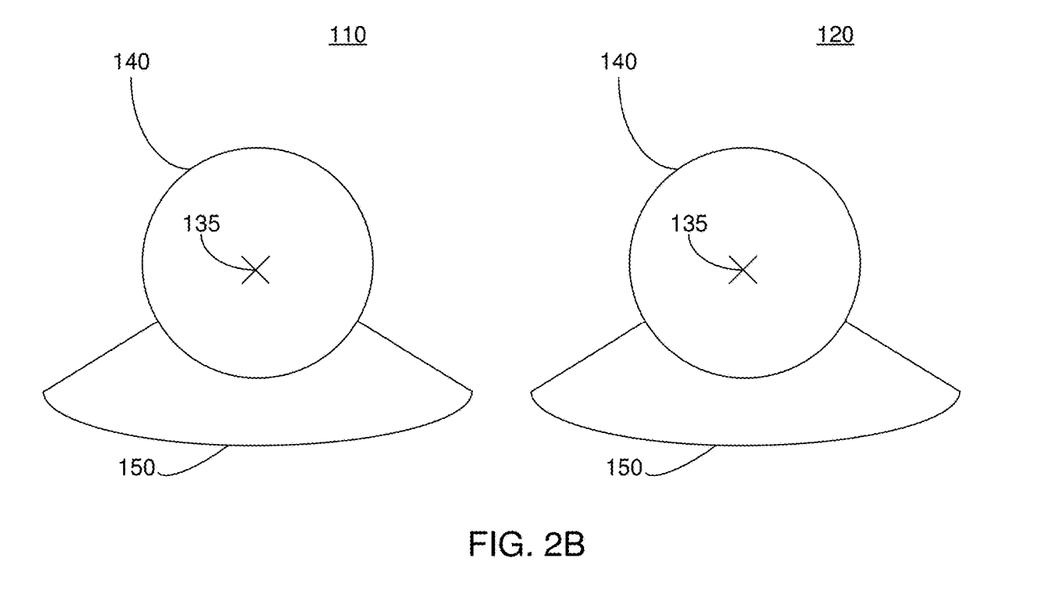

FIGS. 2A-2H illustrate various high level schematic views of an angular rotation sensing system 100, FIGS. 2A-2H being described together. Angular rotation sensing system 100 comprises: a first target 110; a second target 120; and a circuit board 130. As illustrated in FIG. 2B, each of first and second targets 110 and 120 exhibits a longitudinal axis 135 and comprises: a base 140 and one or more target members 150 radially extending away from base 140. First and second targets 110 and 120 are each illustrated in FIG. 2B as comprising one target member 150 to correspond with the circuit arrangement of circuity board 130, however this is not meant to be limiting in any way. In an embodiment where first and second targets 110 and 120 each comprise a plurality of target members 150, as described below, target members 150 of first target 110 are arrayed radially about longitudinal axis 135 thereof. Similarly, target members 150 of second target 120 are arrayed radially about longitudinal axis 135 thereof. First and second targets 110, 120 thus rotate about the shared longitudinal axis 135. In one embodiment, base 140 of each of first and second targets 110 and 120 is generally ring shaped. In another embodiment, each target member 150 of first and second targets 110 and 120 is generally shaped as a partial disc. In the illustrated embodiment of FIG. 2B, target member 150 is shaped a ⅓ of a disc extending from longitudinal axis 135. In one embodiment, where a plurality of target members 150 are provided, each of the target members 150 of each of first and second targets 110, 120 are generally of identical dimensions and the radial distance between vertical center lines of adjacent target members 150 are all generally equal. The shape of each of target members 150 of first target 110 is generally the same as the shape of target members 150 of second target 120.

Figure 2C:
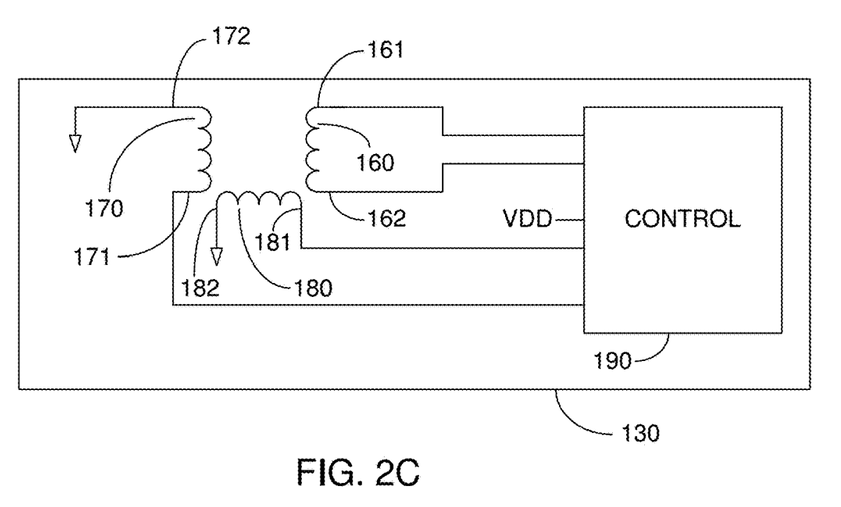

As illustrated in FIG. 2C, circuit board 130 comprises: a transmit coil 160 exhibiting a first end 161 and a second end 162 opposing first end 161; a first receive coil 170 exhibiting a first end 171 and a second end 172 opposing first end 171; a second receive coil 180 exhibiting a first end 181 and a second end 182 opposing first end 181; and a control circuitry 190. Each of first and second receive coils 170 and 180 is magnetically coupled to transmit coil 160. Each of transmit coil 160, receive coil 170 and receive coil 180 is coupled to control circuitry 190. In one embodiment, each of first end 161 of transmit coil 160, second end 162 of transmit coil 160, first end 171 of first receive coil 170 and first end 181 of second receive coil 180 is coupled to a respective terminal of control circuitry 190. Control circuitry 190 is further coupled to a power source (not shown). Each of second end 172 of first receive coil 170 and second end 182 of second receive coil 180 is coupled to a common potential. In one embodiment, receive coils 160 and 170 are electrically offset by about 90 degrees.

Figure 2D:
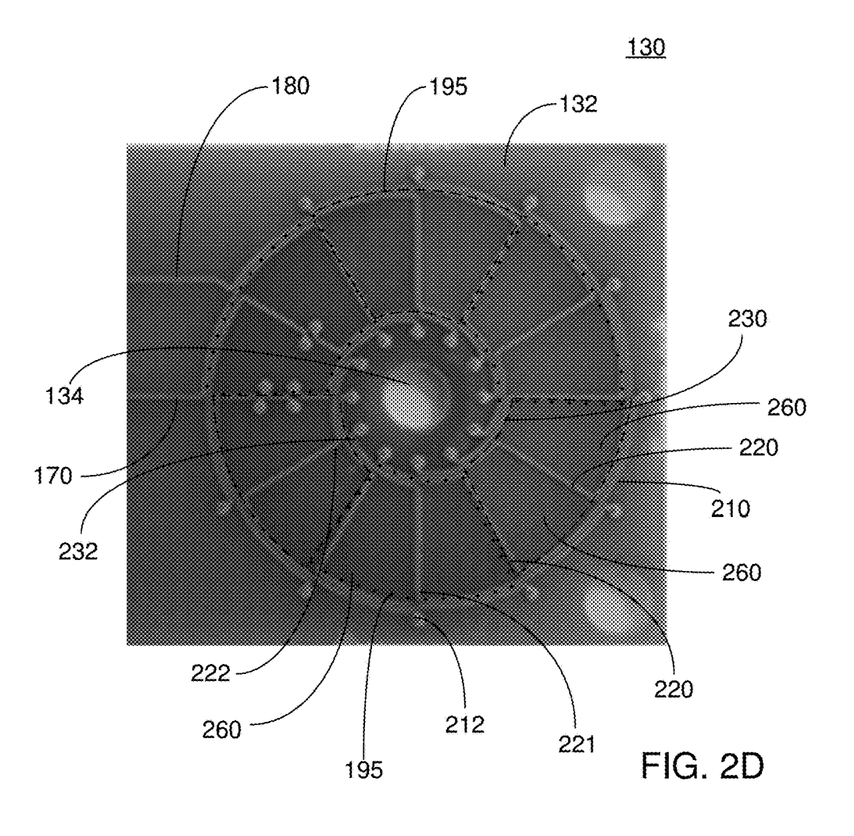
Figure 2E:
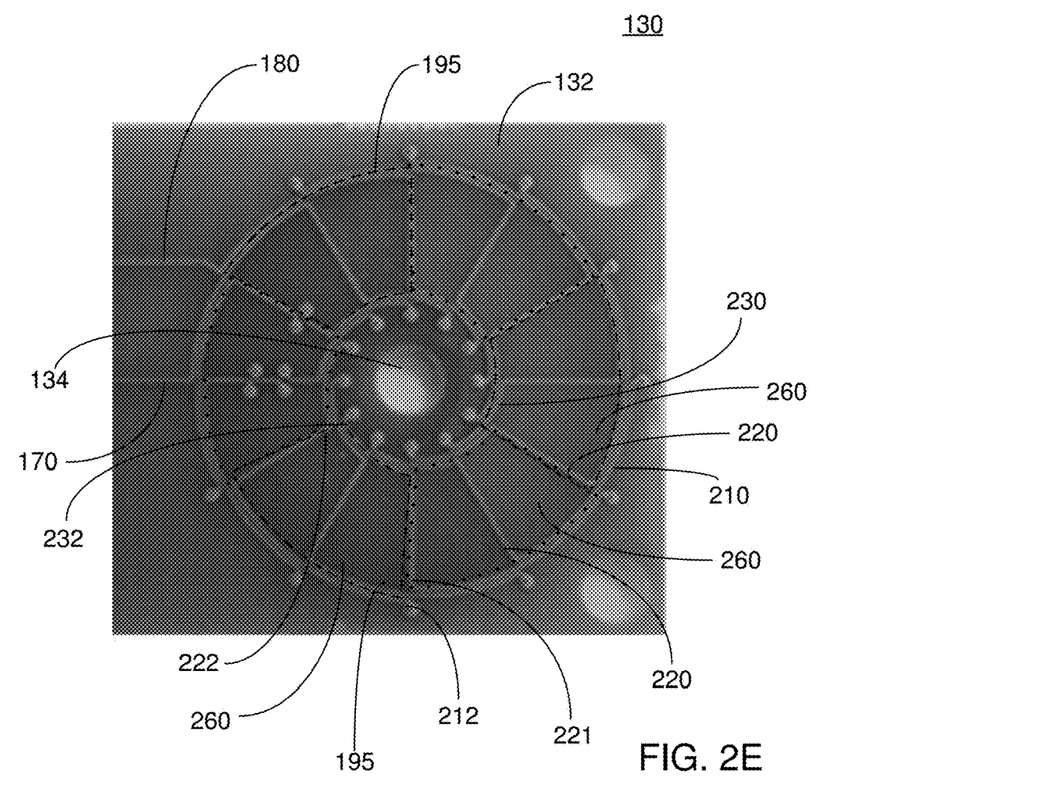
Figure 2F:
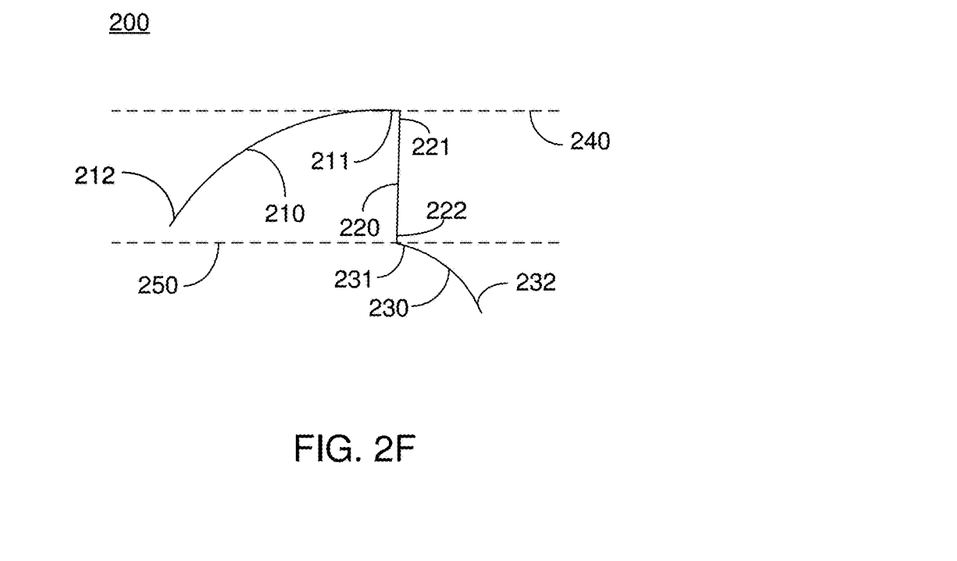

As illustrated in FIG. 2D, on a predetermined layer 132 of circuit board 130, first receive coil 170 and second receive coil 180 each comprise a plurality of loops 190, with adjacent loops shown as dotted, and dashed lines, respectively. Particularly, each of first receive coil 170 and second receive coil 180 is laid out on layer 132 of circuit board 130 in a plurality of segments 200 and each loop 195 is formed by a portion of two adjacent segments 200. Segments 200 of each of first receive coil 170 and second receive coil 180 are radially arrayed about a center portion 134 of layer 132. As illustrated in FIG. 2F, each segment 200 comprises: an outer portion 210 exhibiting a first end 211 and a second end 212 opposing first end 211; an intermediate portion 220 exhibiting a first end 221 and a second end 222 opposing first end 221; and an inner portion 230 exhibiting a first end 231 and a second end 232 opposing first end 231.

Outer portion 210 extends from first end 221 of intermediate portion 220, at first end 211 thereof, in a first general direction towards second end 212 thereof. Inner portion 230 extends from second end 222 of intermediate portion 220, at first end 231 thereof, in a second general direction towards second end 232 thereof. The second general direction opposes the first general direction. In one embodiment, as illustrated, outer portion 210 is concavingly curved when viewed from intermediate portion 220 and inner portion 230 is convexingly curved when viewed from intermediate portion 220. In another embodiment, an axis 240 is defined, axis 240 being orthogonal to intermediate portion 220 and meeting first end 221. Additionally, an axis 250 is defined, axis 250 being orthogonal to intermediate portion 220 and meeting second end 222. Outer portion 210 extends away from axis 240 towards axis 250 and inner portion 230 extends away from axes 240 and 250.

Second end 232 is connected through a via and a radial trace on an additional layer to another segment 200 of the respective one of first receive coil 170 and second receive coil 180. Particularly, first receive coil 170 is laid out on layer 132 such that current flowing through adjacent segments 200 flow in opposing directions, i.e. if a current I1 flows through a first segment 200 in a clockwise direction about center portion 134 then current I1 flows through an adjacent segment 200 in a counter-clockwise direction about center portion 134. Similarly, second receive coil 180 is laid out on layer 132 such that current flowing through adjacent segments 200 flow in opposing directions. In one embodiment, each of first and second receive coils 170, 180 are laid out with multiple segments 200 in a first rotational direction (shown as clockwise). When a full 360° rotation has been achieved, a phase reversal connection is provided and segments 200 then proceed in a second rotational direction, opposing the first rotational direction, until a full 360° rotation has again been achieved. For simplicity the connections to the common potential, and connections on other layers are not shown.

Figure 2G:
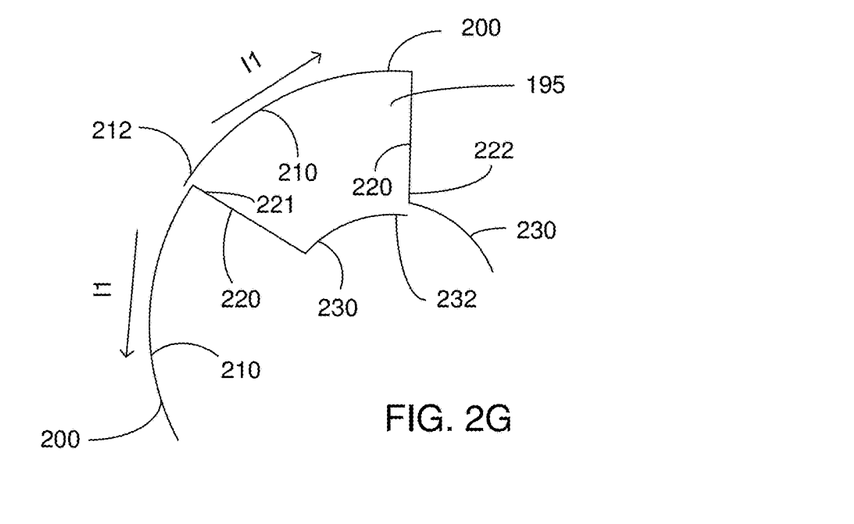

As illustrated in FIGS. 2D and 2G, segments 200 of first receive coil 170 are laid out such that second end 212 of outer portion 210 of each segment 200 is juxtaposed with first end 221 of intermediate portion 220 of an adjacent segment 200 of first receive coil 170. Second end 232 of inner portion 230 of each segment 200 is juxtaposed with second end 222 of intermediate portion 220 of the adjacent segment 200. Due to the opposing current flows of the adjacent segments 200, a loop 195 is formed between the adjacent segments 195. Particularly, each loop 195 is formed by: outer portion 210 and intermediate portion 220 of a first segment 200; and inner portion 230 and intermediate portion 220 of an adjacent segment 200. Similarly, as illustrated in FIG. 2E, segments 200 of second receive coil 180 are laid out such that second end 212 of outer portion 210 of each segment 200 is juxtaposed with first end 221 of intermediate portion of a segment 200 of the opposing phase and second end 232 of inner portion 230 of each segment 200 is juxtaposed with second end 222 of intermediate portion 220 of an adjacent segment 200 of second receive coil 180. Each loop 195 of second receive coil 180 is offset from an adjacent loop 195 of first receive coil 170 by a predetermined angle. In the illustrated embodiment where each of first receive coil 170 and second receive coil 180 exhibits 6 loops, preferably the offset angle is about 30 degrees, i.e. the offset is equal to ½ of the loop 195 circumferential angle.

The total number of loops 195 of each of first receive coil 170 and second receive coil 180 is even such that the sum of the magnetic fields within each of first and second receive coils 170, 180 are cancelled out due to the opposing polarities of adjacent loops 195 described above. As a result, the voltage at the output of each of first receive coil 170 and second receive coil 180 is zero.

For each of first receive coil 170 and second receive coil 180, the shape and size of each adjacent pair of loops 195 generally match the shape and size of each target member 150 of targets 110 and 120, i.e. each loop 195 generally matches the shape and size of ½ of target member 150. As described above in relation to target members 150, in one embodiment each adjacent pair of loops 195 are generally shaped together as a portion of a disc. In the illustrated embodiment of FIGS. 2D-2E, each pair of adjacent loops 195 form a ⅓ disc shape. Thus, target member 150 of target member 110 and target member 150 of target 120 are each the same size and shape of each pair of loops 195 in each of first receive coil 170 and second receive coil 180.

In operation, control circuitry 190 provides an RF signal to transmit coil 160, which generates a respective magnetic field in each of first and second receive coils 170 and 180. As described above, the number of loops 195 in each of first receive coil 170 and second receive coil 180 is even, therefore the magnetic fields of loops 195 cancel each other out and the voltage across each of first receive coil 170 and second receive coil 180 is zero.

When first target 110 faces circuit board 130 and target member 150 of first target 110 covers a pair of adjacent loops 195, the adjacent pairs of loops 195 on either side of the covered pair of loops 195 are left uncovered. Since each target member 150 is the same shape and size as a pair of adjacent loops 195, there will be no effect on the magnetic field cancellations of loops 195. Particularly, in the event that a target member 150 completely covers a pair of adjacent loops 195, the changes in the magnetic fields caused by target member 150 will be uniform across both loops 195.

In the event that target member 150 is not exactly over two adjacent loops 195, target member 150 will cover at least a portion of three loops 195 a portion of first loop 195, the entirety of a second loop 195 and a portion of a third loop 195, the second loop 195 sandwiched between the first loop 195 and the third loop 195. In such a case, the effect of target member 150 on the magnetic fields of the three loops 195 will not be the same. However, the magnetic fields of the first and third loops 195 oppose the polarity of the magnetic field of the second loop 195. Additionally, the area of the portion of the first loop 195 which is not covered is the same as the area of the portion of the third loop 195 which is covered. As a result, the sum of the effects on the magnetic fields of the first and third loops 195 will equal the effect on the magnetic field of the second loop 195, whose polarity opposes that of the first and third loops 195. As a result, the voltage across each of first receiver coil 170 and second receive coil 180 remains zero.

Figure 2H:
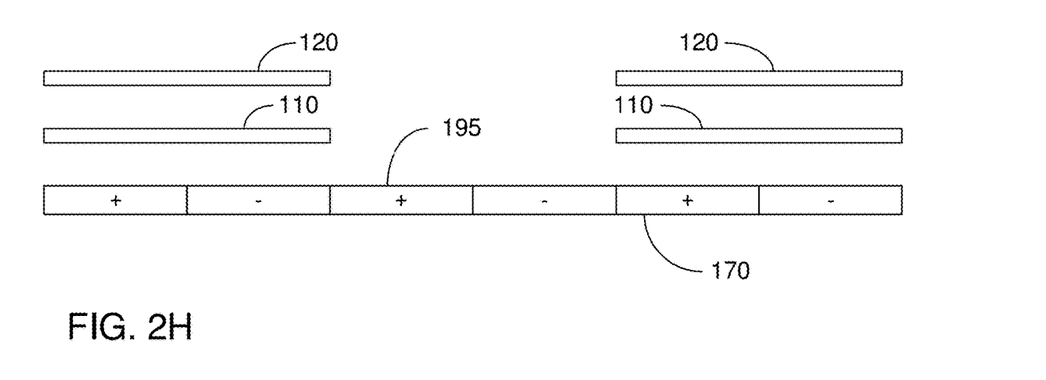
Figure 2I:
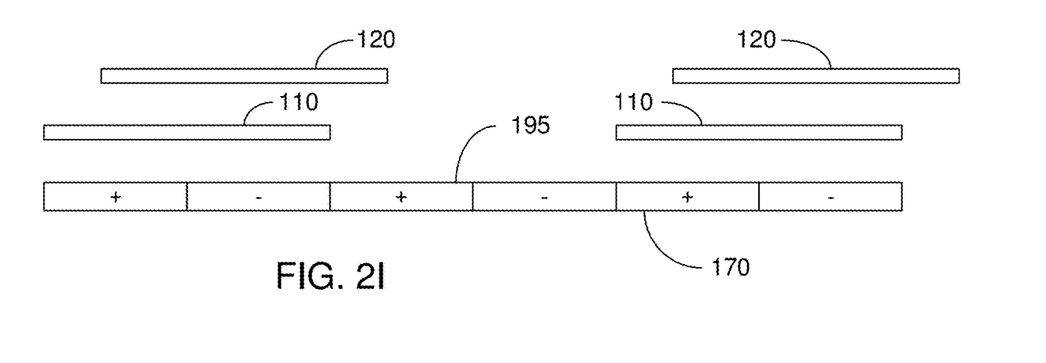

As illustrated in FIG. 2A, first target 110 is between second target 120 and circuit board 130. Initially, as illustrated in FIG. 2H, first and second targets 110 and 120 are arranged such that target members 150 of second target 120 are aligned with target members 150 of first target 110. Thus, when viewed from loops 195 being covered by target members 150 of first target 110, target members 150 of second target 120 are not seen. Target members 150 of second target 120 are shielded by target members 150 of first target 110 and eddy currents are not formed within target members 150 of second target 120. FIGS. 2H and 2I each illustrate only first receive coil 170, however the same effect applies to second receive coil 180.

If both first and second targets 110 and 120 are rotated about their respective longitudinal axes 130 by the same rotation angle, there will be no change in the effects on the different magnetic fields, as described above. If first target 110 is rotated about its respective longitudinal axis 135 by a first rotation angle and second target 120 is rotated about its respective longitudinal axis 135 by a second rotation angle, different than the first rotation angle, target members 150 of target 120 will no longer be shielded by target members 150 of target 110, as illustrated in FIG. 2I. As a result, target members 150 of target 120 will have an effect on the magnetic fields of at least one loop 195. Since a portion of each target member 150 of target 120 is no longer shielded by the respective target member 150 of target 110, while the rest of the target member 150 is still shielded, the effect on the magnetic fields of loops 195 will not be symmetrical. As a result, the magnetic fields will no longer be completely cancelled out and the voltage induced in first and second receive coils 170 and 180 will no longer be zero.

The voltage across first receive coil 170, denoted VCL1, is given as:

$$VCL1 = k1 * \cos(\theta) * V_{pri} * \sin(\omega t) \quad \text{EQ. 1}$$

where k1 is a predetermined gain value dependent on the layout of loops 195, $\theta$ is the angle between target 110 and target 120, $V_{pri}$ is the amplitude of the primary voltage across transmit coil 160, $\omega$ is the frequency of the primary voltage and t is a representation of time.

Similarly, the voltage across second receive coil 180, denoted VCL2, is given as:

$$VCL2 = k1 * \sin(\theta) * Vpri * \sin(\omega t) \quad \text{EQ. 2}$$

Although $\theta$ can be determined from either of VCL1 or VCL2, having two receive coils 170 and 180 provides a more accurate calculation.

In one embodiment, control circuitry 190 demodulates voltages VCL1 and VCL2, and determines angle $\theta$ as a function of the demodulated voltages as:

$$\theta = k1 * [(VC1)^2 + (VC2)^2] \quad \text{EQ. 3}$$

where VC1 is voltage VCL1 after demodulation and VC2 is voltage VCL2 after demodulation.

In another embodiment, control circuitry 190 demodulates one of voltages VCL1 and VCL2, and determines angle $\theta$ as a function of the demodulated voltage:

$$\theta = k2 * VC \quad \text{EQ. 4}$$

where k2 is a predetermined gain value dependent on the area of loops 195.

In another embodiment, control circuitry 190 determines an angle $\theta2$ as the angle between an edge of target member 150 and an edge of a loop pair, i.e. the offset of target member 150 within a loop pair. Angle $\theta2$ is given as:

$$\theta2 = \tan^{-1}(VCL2/VCL1) \quad \text{EQ. 5}$$

As opposed to angle $\theta$ which only provides the difference between the rotation angles of targets 110 and 120, i.e. how much target 120 was rotated in relation to target 110, angle $\theta2$ provides information regarding the rotational position of each of targets 110 and 120, i.e. how much each of targets 110 and 120 were rotated. In the illustrated embodiment where 3 pairs of loops 195 are provided for each of first receive coil 170 and second receive coil 180, angle $\theta2$ will be between 0-120 degrees.

Figure 2J:
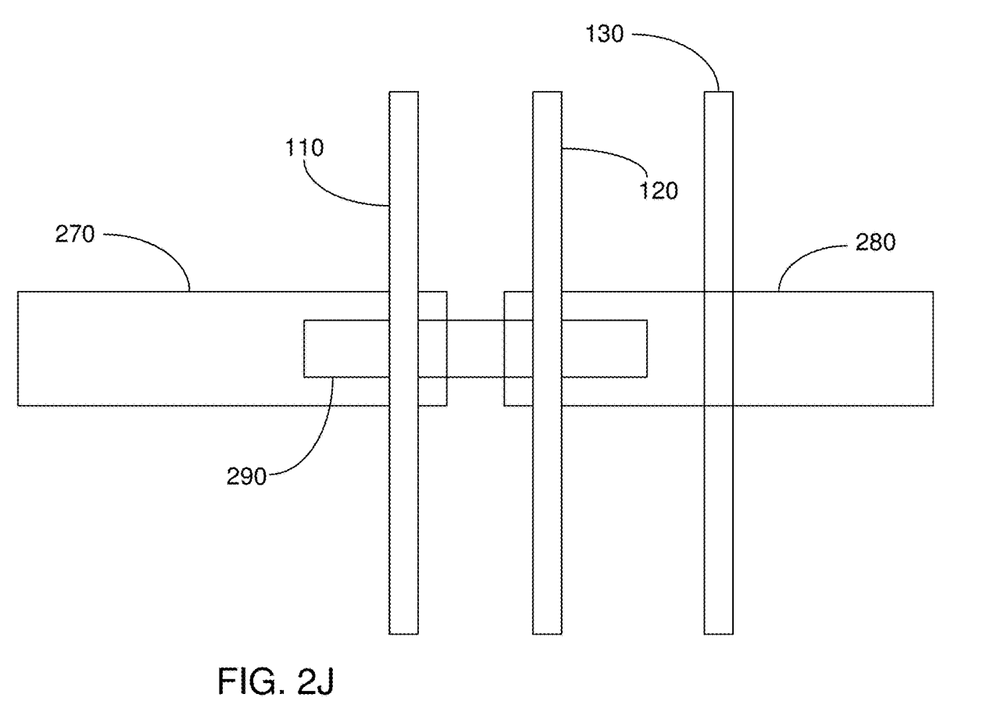

In one embodiment, as illustrated in FIG. 2J, first target 110 is fitted over a motor shaft 270 and second target 120 is fitted over a steering shaft 280. Motor shaft 270 is connected to steering shaft 280 by a torsion bar 290. When steering shaft 280 is rotated, by rotation of the steering wheel 20 (not shown), the torque applied to steering shaft 280 is transferred to motor shaft 270 via torsion bar 290. However, the rotation of motor shaft 270 lags behind the rotation of steering shaft 280 due to the torsion constant of torsion bar 290. As described above, control circuitry 190 determines the difference between the rotation angles of first target 110 and second target 120, i.e. angle θ, and optionally further determines rotational position information of first target 110 and second target 120, i.e. angle θ2. Control circuitry 190 additionally determines the amount of torque applied to steering shaft 280 as a predetermined function of angle θ and the torsion constant of torsion bar 290.

Figure 3A:
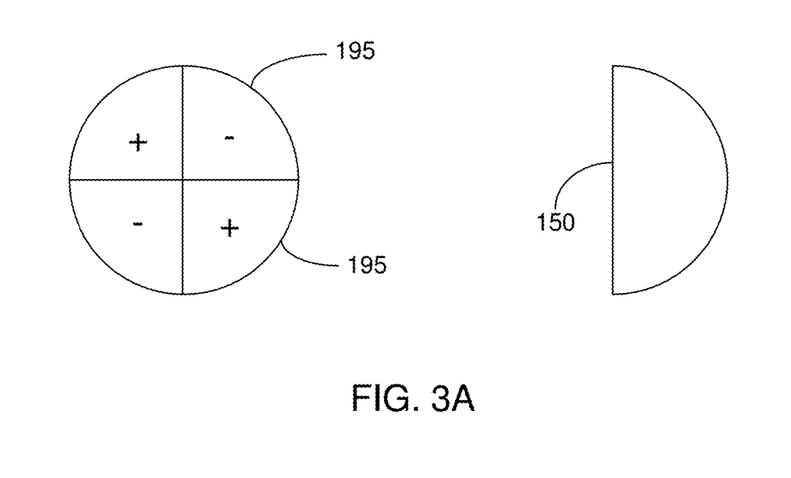
FIGS. 3A-3C illustrate various embodiments of different numbers of loop pairs and corresponding target members.
Figure 3B:
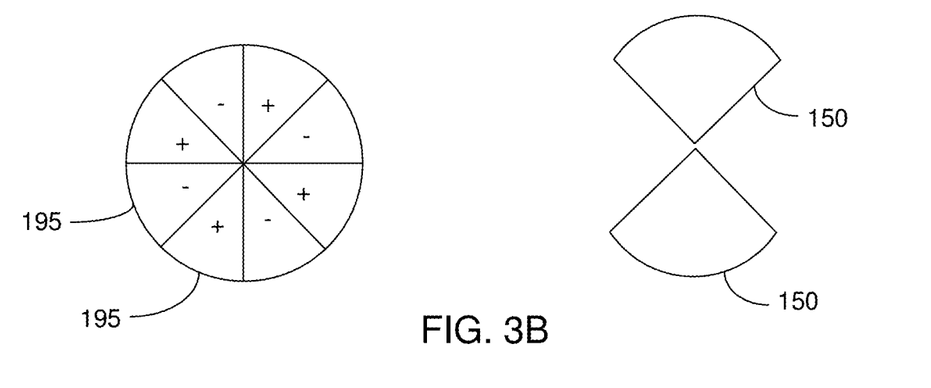
Figure 3C:
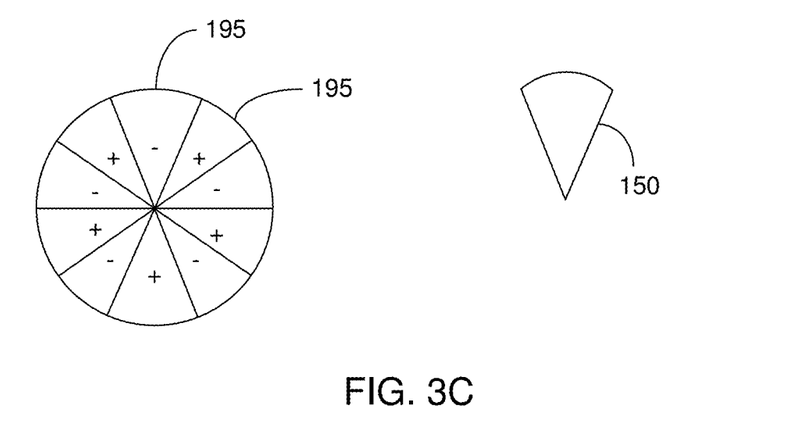

In the embodiment described above, 6 loops 195 were provided for each of first receive coil 170 and second receive coil 180. Correspondingly, a single 120 degree target member 150 was provided for each of target 110 and target 120. In another embodiment, as illustrated in FIG. 3A, 2 pairs of loops 195 are provided for each receive coil. Correspondingly, a single 180 degree target member 150 is provided for each target. In another embodiment, as illustrated in FIG. 3B, 4 pairs of loops 195 are provided for each receive coil. Correspondingly, a pair of 90 degree target members 150 are provided for each target. A pair of target members 150 may be provided because the space between the target members 150 allows for a symmetrical coverage non-coverage area of loops 195. In another embodiment, as illustrated in FIG. 3C, 5 pairs of loops 195 are provided for each receive coil. Correspondingly, a single 72 degree target member 150 is provided for each target. Generally, if the number of loop pairs is greater than 3, and even, the number of target members is half the number of loop pairs. If the number of loop pairs is odd, only 1 target member is provided. In both cases, the size and shape of each target member generally matches the size and shape of each loop pair.

Figure 4A:
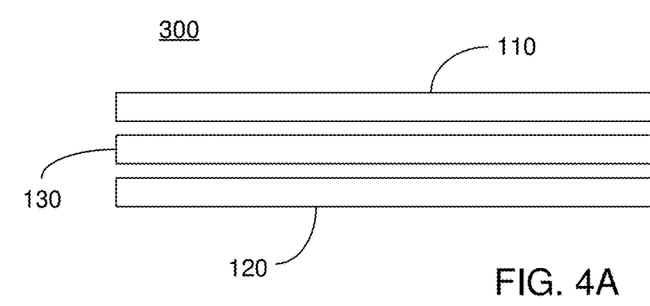
FIGS. 4A-4C illustrate various views of a second embodiment of an angular rotation sensing system.
Figure 4B:
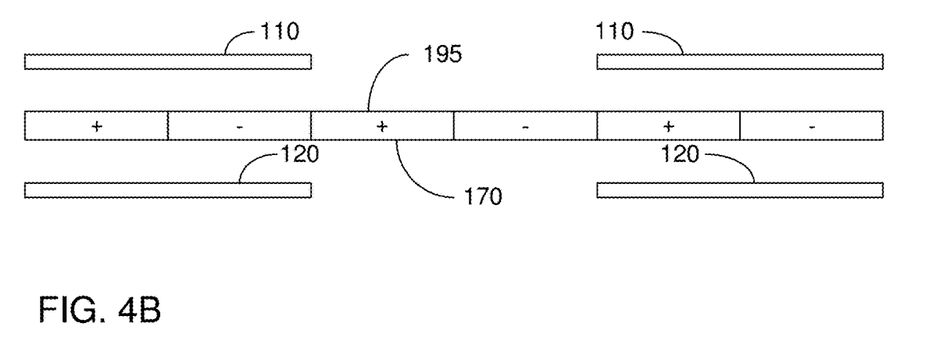
Figure 4C:
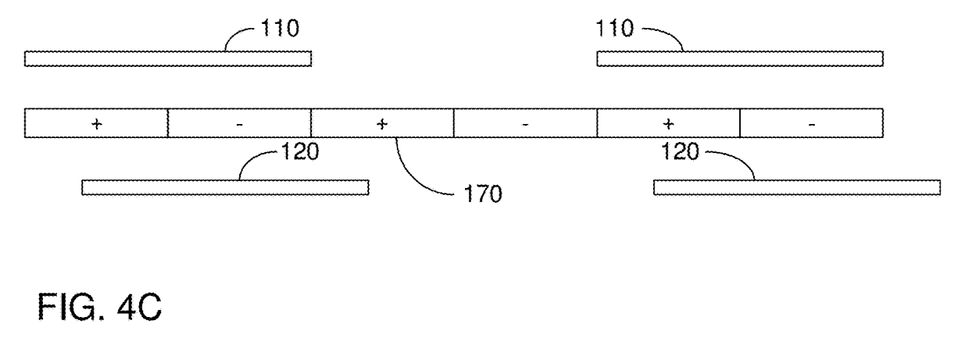

FIG. 4A illustrates a high level schematic diagram of an angular rotation sensing system 300. Angular rotation sensing system 300 is in all respects similar to angular rotation sensing system 100, with the exception that circuit board 130 is positioned between target 110 and target 120. As illustrated in FIG. 4B, when targets 110 and 120 are aligned, the effects of each on the magnetic fields of loops 190 are identical. As described above, the effect of each target member 150 is symmetrical for loops 195. Therefore, overall there will be no change in the difference between voltages VCL1 and VCL2. When first target 110 is rotated by a first rotation angle and second target 120 is rotated by a second rotation angle, as illustrated in FIG. 4C, the effects on the magnetic field will no longer be symmetrical, as described above, and the angle between first target 110 and second target 120 is determined responsive to one or both of voltages VCL1 and VCL2. As described above, only loops 195 of first receive coil 170 are illustrated, however the effects on second receive coil 180 are the same.

Figure 5:
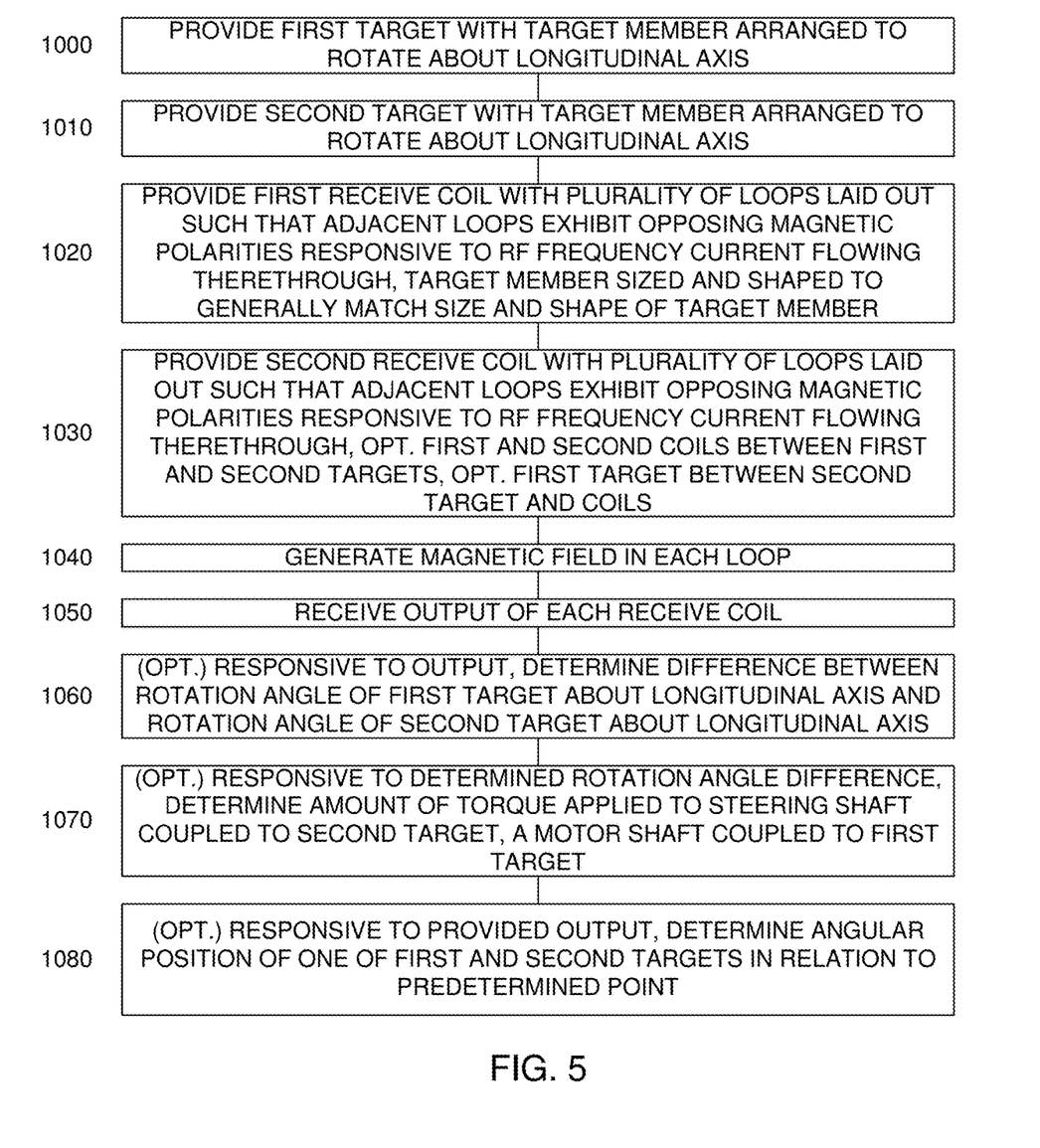
FIG. 5 illustrates a high level flow chart of an angular rotation sensing method, in accordance with certain embodiments.

FIG. 5 illustrates a high level flow chart of an angular rotation sensing method, in accordance with certain embodiments. In stage 1000, a first target is provided. The first target comprises at least one target member arrayed about a longitudinal axis of the first target. The first target is arranged to rotate about its longitudinal axis. In stage 1010, a second target is provided. The second target comprises at least one target member arrayed about a longitudinal axis of the second target. The second target is arranged to rotate about its longitudinal axis.

In stage 1020, a first receive coil is provided. The first receive coil comprises a plurality of loops. The plurality of loops are laid out such that adjacent loops exhibit opposing magnetic polarities responsive to radio frequency (RF) current flowing therethrough. Each of the at least one target member of stage 1000 and each of the at least one target member of stage 1010 is sized and shaped to generally match the size and shape of each pair of adjacent loops of the first receive coil.

In stage 1030, a second receive coil is provided. The second receive coil comprises a plurality of loops. The plurality of loops are laid out such that adjacent loops exhibit opposing magnetic polarities responsive to radio frequency (RF) current flowing therethrough. Each of the at least one target member of stage 1000 and each of the at least one target member of stage 1010 is sized and shaped to generally match the size and shape of each pair of adjacent loops of the second receive coil. Optionally, the second receive coil and the first receive coil of stage 1040 are positioned between the first target of stage 1000 and the second target of stage 1010. In another embodiment, the first target of stage 1000 is positioned between the second target of stage 1010 and the first and second receive coils.

In stage 1040, a magnetic field is generated within each of the plurality of loops of the first receive coil of stage 1020 and the second receive coil of stage 1030. In stage 1050, an output of each of the first receive coil of stage 1020 and the second receive coil of stage 1030 is received. In optional stage 1060, responsive to the received output of stage 1050, a difference between a rotation angle of the first target of stage 1000 about its longitudinal axis and a rotation angle of the second target of stage 1010 about its longitudinal axis is determined. In optional stage 1070, responsive to the determined rotation angle difference of optional stage 1060, an amount of torque applied to a steering shaft is determined. The steering shaft is coupled to the second target of stage 1010 and a motor shaft is coupled to the first target of stage 1000. In optional stage 1080, responsive to the provided output of stage 1050, the angular position of one, or both, of the first target of stage 1000 and the second target of stage 1010 is determined in relation to a predetermined point, preferably the edge of the presently covered loop pair. In other words, the amount the first or second target was rotated is determined.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

The terms "include", "comprise" and "have" and their conjugates as used herein mean "including but not necessarily limited to".

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

The invention claimed is:

1. An angular rotation sensor system comprising:
    a first target, said first target comprising a target member radially extending from a longitudinal axis of said first target, said first target arranged to rotate about said longitudinal axis;
    a second target, said second target comprising a target member radially extending from a longitudinal axis of said second target, said second target arranged to rotate about said longitudinal axis of said first target;
    a transmit coil;
    a first receive coil comprising a plurality of loops, said plurality of loops of said first receive coil laid out such that adjacent loops of said plurality of loops exhibit opposing magnetic polarities responsive to a radio frequency current injected into said transmit coil; and
    a second receive coil comprising a plurality of loops, said plurality of loops of said second receive coil laid out such that adjacent loops of said plurality of loops exhibit opposing magnetic polarities responsive to a radio frequency current injected into said transmit coil;
    wherein each of said target member of said first target and said target member of said second target is shaped and sized to generally match a shape and size of a pair of adjacent ones of said plurality of loops, wherein the shape and size of each of said target member of said first target is generally the same as the shape and size of each of said target member of said second target and wherein the first target and the second target are positioned in overlying relation to the first receive coil and the second receive coil.

2. The angular rotation sensor system of claim 1, wherein said first and second receive coils are between said first target and said second target.

3. The angular rotation sensor system of claim 1, wherein said first target is between said second target and said first and second receive coils.

4. The angular rotation sensor system of claim 1, further comprising a control circuitry coupled to each of said first and second received coils, said control circuitry arranged, responsive to an output of said first and second receive coils, to determine a difference between a rotation angle of said first target about said longitudinal axis of said first target and a rotation angle of said second target about said longitudinal axis of said second target.

5. The angular rotation sensor system of claim 4, wherein said first target is coupled to a motor shaft and said second target is coupled to a steering shaft, and wherein said control circuitry is further arranged, responsive to said determined rotation angle difference, to determine an amount of torque applied to the steering shaft.

6. The angular rotation sensor system of claim 1, further comprising a control circuitry coupled to each of said first and second received coils, said control circuitry arranged, responsive to an output of said first and second receive coils, to determine an angular position of one either of said first target and said second target in relation to a predetermined point.

7. The angular rotation sensor system of claim 1, wherein each of said first and second targets comprise at least one additional target member, said respective target member and said at least one additional target member arrayed about said longitudinal axis.

8. The angular rotation sensor system of claim 7, wherein the number of said pairs of adjacent ones of said plurality of loops of said first receive coil are even, and the number of additional target members are one less than ½ the number of said pairs.

9. An angular rotation sensing method, the method comprising:
    providing a first target, said first target comprising a target member radially extending from a longitudinal axis of said first target, said first target arranged to rotate about said longitudinal axis;
    providing a second target, said second target comprising a target member radially extending from a longitudinal axis of said second target, said second target arranged to rotate about said longitudinal axis of said first target;
    providing a first receive coil, said first receive coil exhibiting a plurality of loops, said plurality of loops laid out such that adjacent loops of said plurality of loops exhibit opposing magnetic polarities responsive to a first radio frequency current flowing therethrough;
    providing a second receive coil, said second receive coil exhibiting a plurality of loops, said plurality of loops laid out such that adjacent loops of said plurality of loops exhibit opposing magnetic polarities responsive to a second radio frequency current flowing therethrough;
    generating a respective magnetic field in each of said plurality of loops; and
    receiving an output of each of said pair of receive coils, wherein each of said target member of said first target and said target member of said second target is shaped and sized to generally match a shape and size of each pair of adjacent ones of said plurality of loops, wherein the shape and size of each of said target member of said first target is generally the same as the shape and size of each of said target member of said second target and wherein the first target and the second target are positioned in overlying relation to the first receive coil and the second receive coil.

10. The method of claim 9, wherein said provided first and second receive coils are between said provided first target and said provided second target.

11. The method of claim 9, wherein said provided first target is between said provided second target and said provided first and second receive coils.

12. The method of claim 9, further comprising, responsive to said provided output, determining a difference between a rotation angle of said first target about said longitudinal axis of said first target and a rotation angle of said second target about said longitudinal axis of said second target.

13. The method of claim 12, wherein said provided first target is coupled to a motor shaft and said provided second target is coupled to a steering shaft, wherein the method further comprises, responsive to said determined rotation angle difference, determining an amount of torque applied to the steering shaft.

14. The method of claim 9, further comprising, responsive to said provided output, determining an angular position of either one of said provided first target and said provided second target in relation to a predetermined point.

15. The method of claim 9, wherein each of said provided first and provided second targets comprise at least one additional target member, said respective target member and said at least one additional target member arrayed about said longitudinal axis.

16. The method of claim 15, wherein the number of said pairs of adjacent ones of said plurality of loops of said first receive coil are even, and the number of additional target members are one less than ½ the number of said pairs.

17. An angular rotation sensor system comprising:
- a first target, said first target comprising a target member radially extending from a longitudinal axis of said first target, said first target arranged to rotate about said longitudinal axis of said first target;
- a second target, said second target comprising a target member radially extending from a longitudinal axis of said second target, said second target arranged to rotate about said longitudinal axis of said first target;
- a transmit coil;
- a receive coil comprising a plurality of loops laid out such that adjacent loops exhibit opposing magnetic polarities responsive to a radio frequency current injected into said transmit coil; and
- a control circuitry coupled to said receive coil, wherein each of said target member of said first target and said target member of said second target is shaped and sized to generally match a shape and size of a pair of adjacent ones of said plurality of loops,
- wherein the shape and size of each of said target member of said first target is generally the same as the shape and size of each of said target member of said second target and wherein the first target and the second target are positioned in overlying relation to the receive coil.

* * * * *